Dec. 12, 1939.   H. R. BARNICOAT   2,183,440

FASTENING DEVICE FOR COVERS AND THE LIKE

Filed Jan. 16, 1939

INVENTOR
HAROLD R. BARNICOAT
BY Norris & Bateman
ATTORNEYS

Patented Dec. 12, 1939

2,183,440

UNITED STATES PATENT OFFICE 2,183,440

FASTENING DEVICE FOR COVERS AND THE LIKE

Harold Randolph Barnicoat, Kingston-on-Thames, England, assignor to Simmonds Development Corporation Limited, London, England Application January 16, 1939, Serial No. 251,258
In Great Britain February 7, 1938

7 Claims. (Cl. 287—20)

This invention relates to fastening devices which are more particularly but not exclusively intended for engine cowlings, inspection covers and the like, which are generally known as cowling fasteners. The invention has for its object to provide a fastening device which may conveniently be operated by a screw-driver, coin or other suitable implement, and which lends itself to flush fitting with the surface which it fastens whilst being simple and effective in operation.

My improved fastening device comprises a spigot member which is adapted to be secured to one part to be fastened and which is formed with a gapped flange or groove, one or more flanges adapted to be secured to a second part to be fastened and to engage the said gapped flange or groove of the spigot member, and spring pressed means for stopping the gap or gaps of the flange or groove to prevent disengagement of the flange or flanges secured to the said second part. Preferably the spigot member is adapted to be rotatably secured to its part and is arranged so that for fastening, its head extends through a suitable hole or socket member in the second part to be fastened, there being provided a groove in the spigot member which is gapped to allow one or more transversely extending flanges to be engaged therewith by rotation of the spigot after a flange has been aligned with the groove at a gap.

Figure 1:
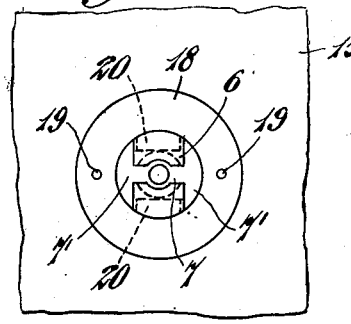
Figure 2:
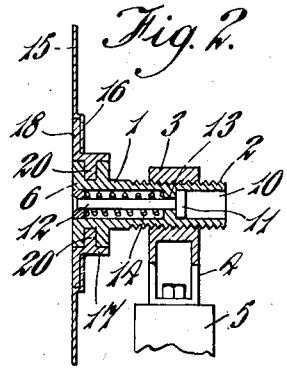
Figure 3:
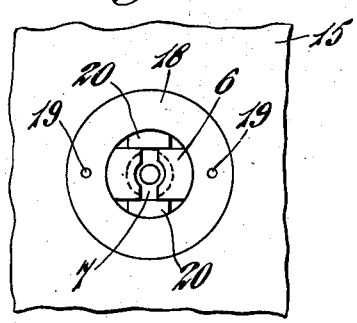
Figure 4:
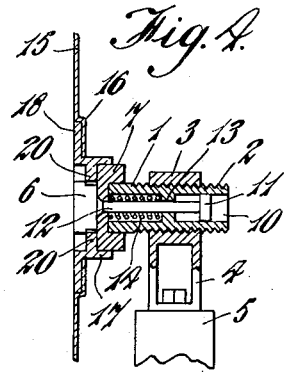
Figure 8:
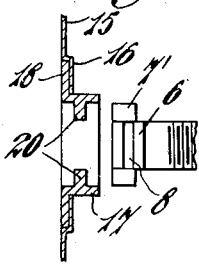

The present preferred form of the fastening device in accordance with this invention is illustrated in the accompanying drawing, in which, Figures 1 and 2 are respectively a front elevation and longitudinal section of the device showing two parts fastened together;

Figures 3 and 4 are similar views illustrating the device in its unfastened position; and Figures 5 to 8 are partial side elevational views, partly in section, illustrating the various positions of the spigot member during fastening and unfastening.

Referring to the drawing, the spigot member 1 of the fastening device has a screwed shank 2 which rotatably engages a nut 3 carried by supporting lugs 4 on one part 5 to be fastened, e. g., an aircraft frame member. The head of the spigot is enlarged in the manner of an ordinary bolt and comprises two parts which are relatively slidable in an axial direction. One part 6 of the spigot head, which is integral with the shank 2, is formed by machining two parallel flats on a cylindrical head, thus reducing the width between the flats substantially to the diameter of the shank, as shown in Figures 1 and 3, whilst the curved walls of the head part 6 are arcuately grooved to reduce the diameter to that of the shank, thereby forming a gapped groove 8, as more clearly shown in Figures 5 to 8. The spigot head part 6 is also grooved in an axial directiton to form a channel 9 (see Figures 7 and 8) between the two flats. This channel 9 passes through the axis of the spigot, and extends from the top substantially to the bottom of the head part 6. The spigot member 1 is provided with an axial bore 10 having a diameter which accommodates the head 11 of a pin 12, the function of which will be described later. The diameter of the bore is reduced at an intermediate part of the shank 2 to form a shoulder 13.

The second part of the spigot head comprises a slidable member shown in the present instance as a crosshead 7 which engages the axially directed channel 9, the extremities of the crosshead being formed with integral segments 7', the inner surfaces of which are flat and co-operate with the flats on the head part 6, whilst the outer surfaces thereof are arcuately curved so as virtually to form a continuation of the arcuate walls of the head part 6. The segments are not grooved and in the positions shown in Figures 1, 2 and 8, block the gaps in the groove 8 formed by the flats. The end of the pin 12 is riveted to the crosshead 7, which is suitably enlarged to receive it, or otherwise suitably secured thereto. A compression spring 14, housed in the bore 10 between the crosshead 7 and the shoulder 13 and surrounding the shank of the pin 12, urges the crosshead outwardly. This shoulder 13 also serves as a stop co-operating with the head 11 of the pin to limit movement of the crosshead under the influence of the spring, whereby the end of the crosshead is normally held flush with the end of the head part 6, as shown in Figure 2. The crosshead 7, being slidable in the axially directed channel 9, can be moved against the action of the spring 14 to a position in which the gaps in the groove 8 are open.

The second part 15 to be fastened, e. g., the cowling of an engine, is suitably dished and the dished portion 16 is bored to a diameter in excess of the diameter of the spigot head. Within the hole thus formed is a socket member 17 which has a peripheral flange 18 by which it is secured by rivets 19 or the like to the part 15, and which also has two diametrically opposite transversely extending flanges 20 that are suitably shaped to co-operate with the segments 7' integral with the crosshead 7. The internal diameter of the cylindrical part of the socket member 17 is preferably increased towards the end which receives the spigot member 1 so as to facilitate the alignment of the spigot and socket members.

Figure 7:
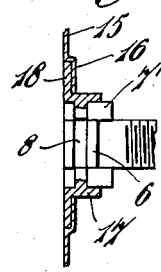
Figure 6:
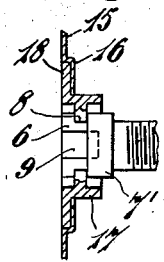
Figure 5:
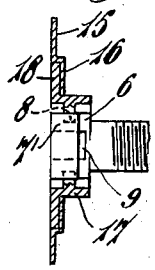

The operation of the device is as follows. To fasten the two parts together, the spigot head and socket are aligned so that the flanges 20 register with the segments 7' as shown in Figure 5. A screw-driver or like implement is inserted through the socket, and, as the spigot is firmly supported, the crosshead 7 can be depressed against the pressure exerted by the spring 14 to open the gaps in the groove 8. The socket can then be pushed into engagement with the spigot head, so that the transversely extending flanges 20 are brought into register with the said gaps, as shown in Figure 6. The spigot may then be rotated by the operating implement until the flanges 20 are engaged in the groove 8, as shown in Figure 7. Alternatively, the crosshead 7 may be depressed by pressure on the part 15, the flanges 20 abutting against the segments 7'. On release of pressure on the implement, the crosshead 7 springs back under the action of the spring 14 to the position shown in Figure 8, when the gaps in the groove 8 are blocked by the segments 7', thus securely fastening the parts together.

It will be appreciated that by screwing the spigot in its supporting nut the parts may be firmly secured together, whilst any wear may likewise be taken up. When it is desired to release the parts fastened together, the crosshead 7 is depressed, so that the gaps in the groove 8 are opened, and the spigot is then rotated until it has the position shown in Figures 3 and 4, when the spigot member 1 may be withdrawn from the socket 17, this withdrawal being aided by the spring 14.

I claim:

1. A fastening device comprising a spigot member which is adapted to be secured to one part to be fastened and which is formed with a head comprising two parts, one part being integral with the spigot shank and having a gapped lateral groove and an axially directed channel and the other part comprising a member slidable in said channel and means adapted to open and stop the gap in the groove on relative axial movement of said slidable member, a flange adapted to be secured to a second part to be fastened and to be brought into engagement with the said groove after the flange has been aligned with the groove at the gap therein, and a spring urging the said slidable member outwardly to bring the said means into position to stop the gap in the groove and prevent disengagement of the said flange.

2. A fastening device according to claim 1, wherein the spigot member is provided with an axial bore and the said spring acting to urge the slidable member outwardly is housed within said bore.

3. A fastening device according to claim 1, wherein the spigot member is formed with an axial bore and the said spring acting to urge the slidable member outwardly is housed within said bore, the diameter of the said bore being reduced at an intermediate part thereof to form a shoulder serving as an abutment for the said spring, and a pin secured at one end to the slidable member being housed within said bore and being formed with a head portion that co-operates with the said shoulder to limit movement of the slidable member under the action of said spring.

4. A fastening device according to claim 1, wherein the spigot head part integral with the shank comprises a grooved cylindrical wall having two parallel flats, and the ends of the slidable member are formed with integral segments, the inner surfaces of such segments being flat and co-operating with the said parallel flats, and the outer surfaces thereof being arcuately curved so as substantially to form a continuation of the arcuate walls of the fixed head part.

5. A fastening device comprising a spigot member which is adapted to be secured to one part to be fastened and which is formed at one end thereof with a gapped lateral extension and an axially directed channel, a member slidable in said channel and provided with means adapted to open and stop the gap in the said lateral extension on relative axial movement of said slidable member, a compression spring that engages the slidable member to urge it outwardly housed within an axial bore provided in the spigot member, and a socket member adapted to be secured to a second part to be fastened and formed with a flange adapted to engage the said lateral extension after alignment therewith at the gap therein.

6. A fastening device comprising a spigot member which is formed with a screw-threaded shank whereby it is adapted to be rotatably secured to one part to be fastened and which is formed with a head comprising two parts, one part being integral with the spigot shank and having a lateral flange with gaps therein and an axially directed channel and the other part comprising a crosshead slidable in said channel and formed with means adapted to open and stop the said gaps on relative axial movement of the crosshead, a spring housed within the spigot shank urging the said movable head part into the position in which the said gaps are stopped, and a socket member adapted to be secured to a second part to be fastened and provided with flanges adapted to be brought into engagement with the said lateral flange after the said flanges have been aligned with the said lateral flange at the gaps therein.

7. A fastening device according to claim 6, wherein the said socket member is formed with two flanges secured to diametrically opposite parts thereof, and such flanges are shaped to co-operate with the said means of the movable head part for stopping the said gaps.

HAROLD RANDOLPH BARNICOAT.